Jan. 10, 1950     H. G. GRIESBAUM     2,494,172
ADJUSTABLE CALCULATING CHART

Filed Oct. 4, 1946     4 Sheets-Sheet 1

Henry G. Griesbaum
INVENTOR.

BY Victor J. Evans & Co.
ATTORNEYS

Jan. 10, 1950  H. G. GRIESBAUM  2,494,172
ADJUSTABLE CALCULATING CHART
Filed Oct. 4, 1946  4 Sheets-Sheet 2

Henry G. Griesbaum
INVENTOR.

BY Victor J. Evans & Co.
ATTORNEYS

Patented Jan. 10, 1950

2,494,172

UNITED STATES PATENT OFFICE 2,494,172

ADJUSTABLE CALCULATING CHART

Henry G. Griesbaum, Pevely, Mo.

Application October 4, 1946, Serial No. 701,343

1 Claim. (Cl. 235—83)

My present invention relates to an improved adjustable calculating chart of the type comprising a circular board having indicia thereon and formed with a rotating ring also carrying indicia thereon whereby the positioning of the ring with relation to the board will permit the calculation of the solution of problems in addition and subtraction on one side, and multiplication and division on the other side.

In the accompanying drawings I have illustrated one complete example of the physical embodiment of my invention according to the best mode I have thus far devised but it will be understood that various changes and alterations in the exemplified structure may be made within the scope of the appended claim.

In the drawings—

Figure 1:
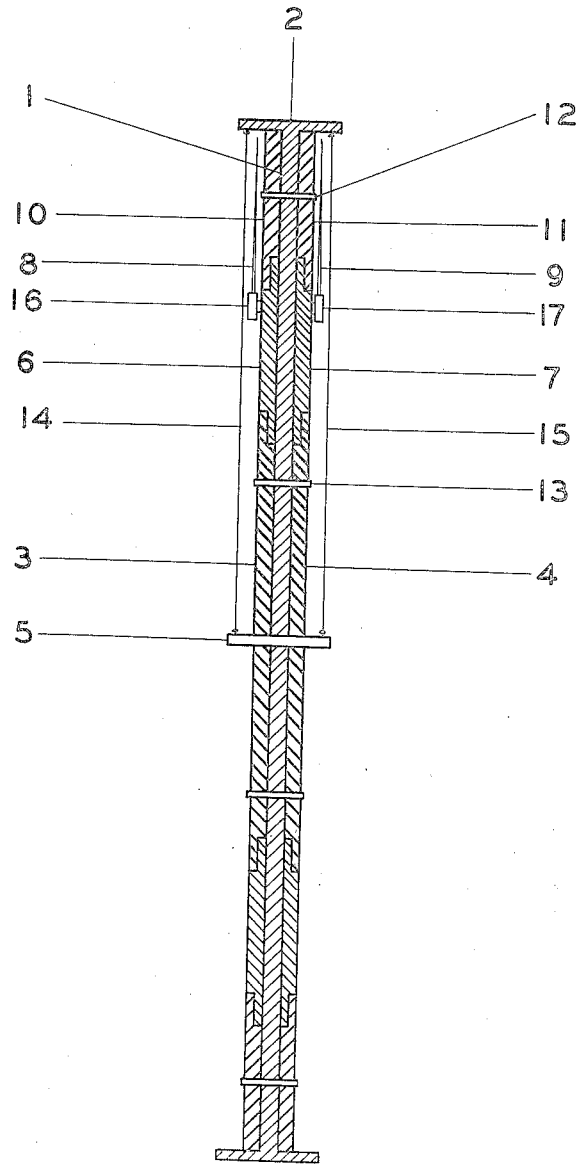
Figure 1 is a horizontal sectional view of the chart structure of my invention.

Referring now to the drawings wherein like characters indicate like parts, I have illustrated the present embodiment of my invention as including a circular base 1 of suitable material such as thin wood, paper board, or plastic and having a peripheral flange 2 extending equidistant upwardly and downwardly from the base 1.

The center disks 3 and 4 are secured concentrically of the base by bolt 5, and the annular slide rings 6 and 7 have their inner edges abutting respectively the outer periphery of the center disks. These slide rings are rotatable about the center disks and with relation to the base, and carry thereon respectively the indicating needles 8 and 9.

The fixed outer rings 10 and 11 are disposed circumferentially of the slide rings 6 and 7 respectively and are designed to fit snugly between the outer peripheries of the slide rings and the peripheral flange 2 of the base 1. These outer rings are secured to the base by bolts 12 while the inner disks 3 and 4 are secured to the base by bolts 13.

Reading wires 14 and 15 are located on both sides of the chart and extend from the outer ends of the bolt 5 to the upper and lower edges of the flange 2. Knobs 16 and 17 on the slide rings 6 and 7 respectively provide a means for rotating the slide rings with relation to the base and the center disks and outer rings and the needles of course move with these slide rings.

Figure 4:
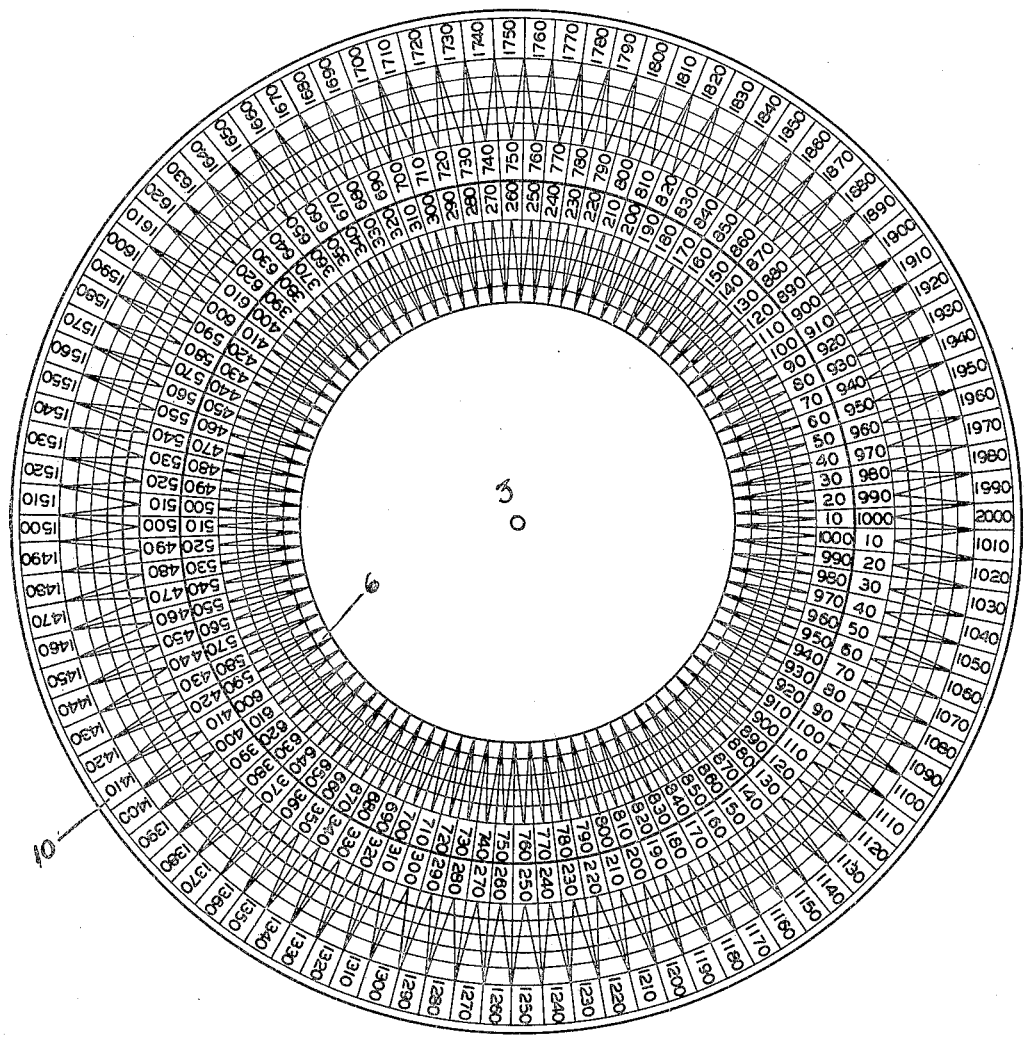
Figure 4 is a detail view in top plan showing the disposition of the calculating indicia for addition and subtraction.

As best seen in Figure 4 of the drawings relating to the solution of addition and subtraction problems the calculating elements comprise the outer fixed ring 10 and the slide ring 6. The outer fixed ring 10 and the slide ring 6 are each inscribed with a series of concentric circles, all having its common center at bolt 5. All of these circles are intersected by a series of radial lines spaced equally from each other. These radial lines provide scales for the outer and inner portions of the respective rings 6 and 10. These scales are graduated from 10 to 1000 with the scales on the fixed ring 10 increasing in a clockwise direction while those on the rotating slide ring 6 increasing in a reverse direction, that is, counterclockwise.

These radial lines, which are thus scaled from 10 to 1000, divide the concentric circles into 100 divisions or equal sectors, as shown in the figures.

The indicating needles 8 and 9 are secured to the rotating slide rings 6 and 7, respectively, at the radial line marked 1000.

Figure 2:
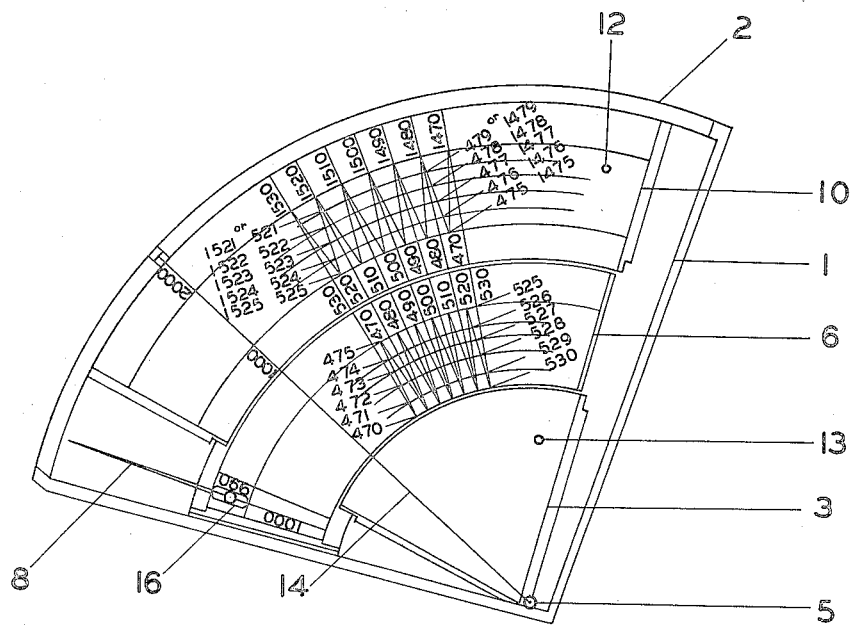
Figure 2 is a partial top plan view showing the device operative to solve problems in addition and subtraction.
Figure 3:
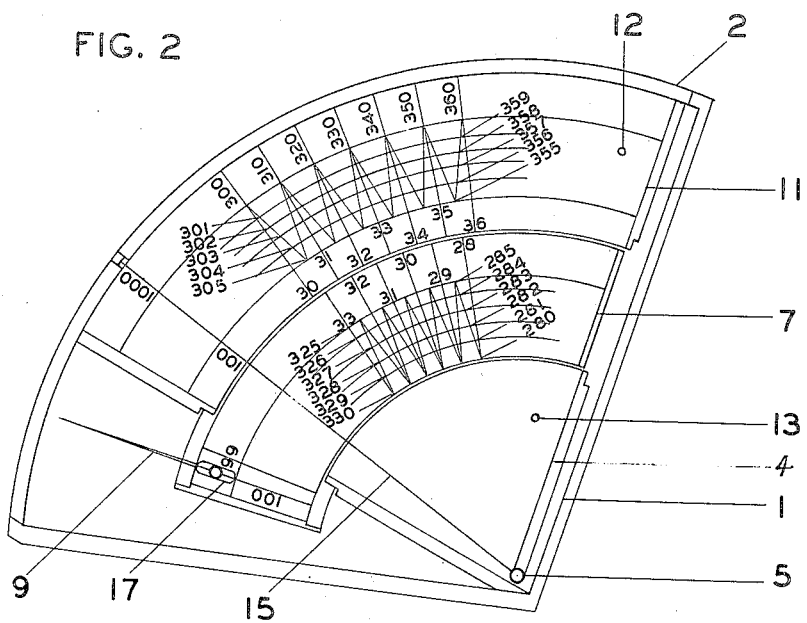
Figure 3 is a partial bottom plan view showing the device operative to solve problems in multiplication and division.

Each of the 100 equal sectors are further subdivided into 10 sub-divisions by inscribing an isosceles triangle, the apex touching one boundary circle at the middle of its arc of its respective sector and the base of the triangle forming the chord (not shown) of the other boundary circle and extending across the sector between the radial lines bounding the same. Thus, each side of the triangle intersects the remaining circles, between the boundary circles just mentioned, to form the equal 10 sub-divisions, as shown in Figure 2. From this figure it will be noticed that the fixed ring 10 is likewise divided but with the apex of the isosceles triangles directed to those on the movable ring 6. The amounts to be added are set in line, directly opposite each division or sub-division, and the result is indicated opposite the thousand division line on either circle.

When either of the two figures of the problem is as much or more than 100 plus 900; 200 plus 800; 300 plus 700; 400 plus 600; or 500 plus 500; then read the amount on the outer portion of the fixed ring 10. Otherwise read the amounts indicated on the inner portion of the fixed ring.

Referring to the same Figure 4 of the drawings, for subtraction problems, the thousand division line of the slide ring 6 is set in line with the division or sub-division of the amount to be subtracted from the fixed ring 10. The result is the amount on the slide ring opposite the amount subtracted from the fixed ring.

Figure 5:
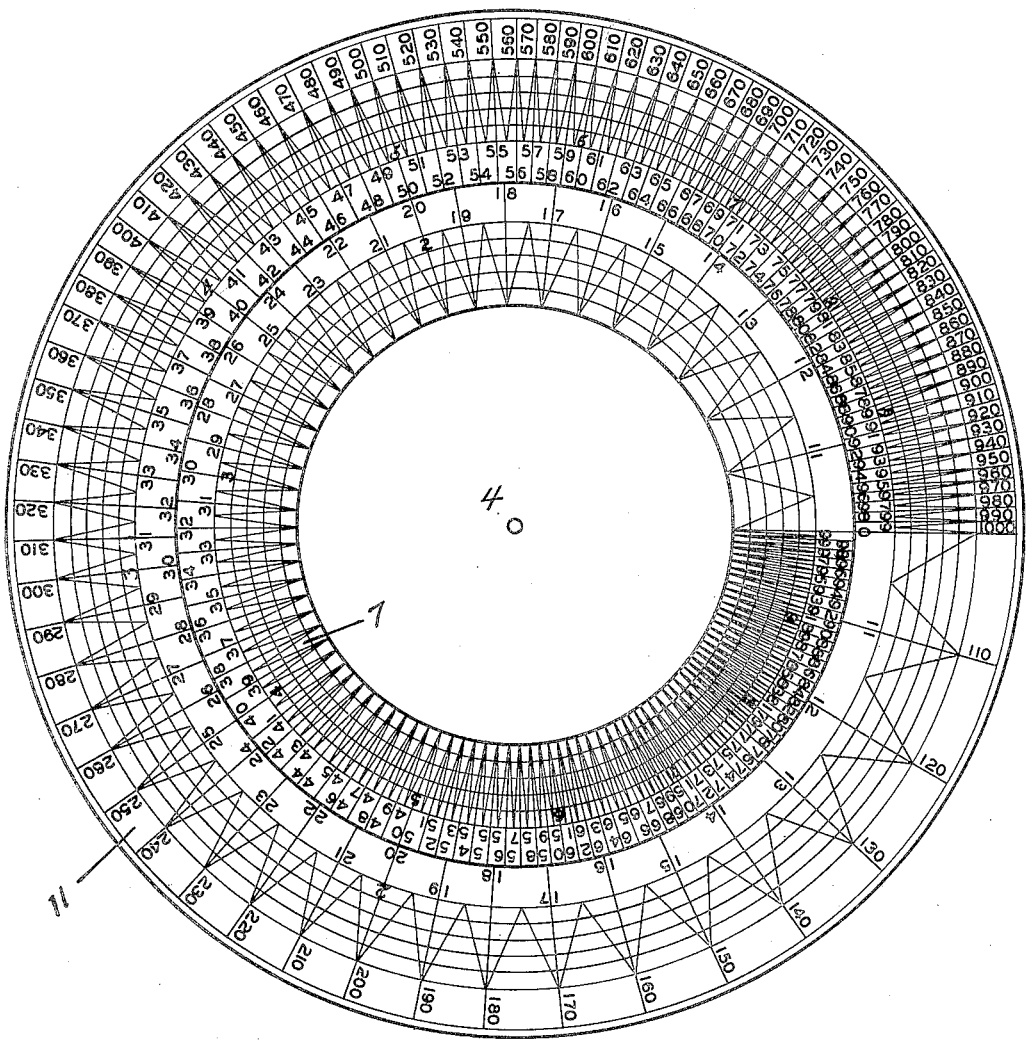
Figure 5 is a detail view in bottom plan showing the positioning of the calculating indicia for multiplication and division.

As best seen in Figure 5 of the drawings multiplication and division problems are solved as follows. The figures on the fixed ring, inside (divisions and sub-divisions), are the multiplicands, and the figures on the outside of the ring (second sub-divisions) are for reading the results of the calculations. The figures on the adjoining slide ring 7 are the multipliers. Both circles have divisions from 1 to 10, and sub-divisions from 10 to 100, and second sub-divisions from 100 to 1000. These comprise logarithmic scales. The amounts on the outside or fixed multiplicand ring increase numerically to the right. The amounts on the slide ring 7, the multipliers, increase to the left. The result of the calculations is indicated on the multiplicand ring, division or sub-division line, or at the intersection of the triangular and circular lines, second sub-divisions. The figures of the division lines are 1, 2, 3, etc.; the sub-division line figures are 10, 11, 12, etc.; and the second sub-division figures are 110, 111, 112, etc.

The multiplying amount at the division or sub-division line of the slide ring 7 is set in line with the multiplicand division or sub-division line on the outer fixed circle 11, and the result is indicated on the fixed ring opposite the index, that is, 1 on the slide ring 7.

When either the multiplier or multiplicand is as much or less than 1×99; 2×49; 4×25; 5×20; 6×16; 3×33; or 7×14 read the result indicated on the multiplicand circle, sub-division amounts.

When either the multiplier or multiplicand is as much or less than 31×32; 30×33; 29×34; 27×37; 26×38; 25×40; 24×41; 23×42; 22×45; 21×47; 20×50; 19×52; 18×55; 17×58; 16×62; 15×66; 14×71; 13×76; 12×83; 11×90; 10×100; or 28×36; read the result indicated on the outer fixed circle, second sub-division, intersection of triangular and circular lines. If either the multiplier or multiplicant is larger than the above combinations, annex one figure.

In multiplying five figures as 333×33 (10989) four figures are first multiplied 33×33, the result indicated on the circle as 108 and annexing final figures of 3×3 or 1089. This leaves 300×33 to be multiplied, sub-divisions 30×33 result indicated on the circle as 990, to multiply by 100 annex a cipher, or 9900 and the 9900 is added to 1089 giving 10989 as the result.

In multiplying six figures as 333×333 (110889) the method is the same as the calculation for five figures (10989) plus 300×3 described above or 9900 and the 300×300 or 30×30 indicated on the circle as 900 plus the two ciphers to be annexed or 90000 giving a total result of 110889.

Higher figure problems are calculated in the same manner.

The calculation of problems in division is the reverse of the multiplying procedure. The sub-division line, 100, on the fixed outer circle 11 is set in line with the division or sub-division line on the slide ring 7 of the amount to be divided. The result is the amount on the fixed ring opposite the amount of the divisor on the rotating ring as 340÷20 equals 17. The sub-division line, 100, on the fixed ring is set in line with the amount 340, 34th subdivision line on the slide ring. The result is indicated on the fixed ring opposite the 20th sub-division line, on the rotating slide ring, or 17.

From the above description of the structure and operation of the calculating chart of my invention it will be apparent that any person may in a short time become skilled in the use of the chart and that intricate problems may be solved with facility and speed, and accuracy.

Having thus fully described my invention, what I claim as new and desire to secure by Letters Patent is:

A calculating chart comprising a base having a peripheral flange, a center disk secured to the base concentric thereof, an outer fixed ring on the base concentric about said disk and spaced therefrom, said outer ring carrying a series of concentrically arranged circles intersected by equally spaced radial lines forming sectors, calculating indicia adjacent said radial lines, respectively, in increasing order clockwise indicating main divisions, a pair of equal length converging lines dividing each sector into equal sub-divisions of each main division, a slide ring slidably mounted on said base and between the center disk and the outer fixed ring carrying calculating indicia in divisions and sub-divisions, similar to those on said outer fixed ring, except that they progress in the opposite direction, an indicating wire between the center of the center disk and the base flange, and an indicating needle on the slide ring.

HENRY G. GRIESBAUM.

REFERENCES CITED

The following references are of record in the file of this patent:

UNITED STATES PATENTS

| Number | Name | Date |
| --- | --- | --- |
| 1,017,719 | Watts | Feb. 20, 1912 |
| 1,056,775 | Brunton | Mar. 25, 1913 |
| 1,207,439 | Picolet | Dec. 5, 1916 |
| 1,893,235 | Iverson | Jan. 3, 1933 |